Feb. 18, 1941.  E. ST. JOHN  2,231,962
MEANS FOR SUSPENDING AERIAL CABLES
Filed May 19, 1939   4 Sheets-Sheet 1

INVENTOR
E. ST. JOHN
BY
J. MacDonald
ATTORNEY

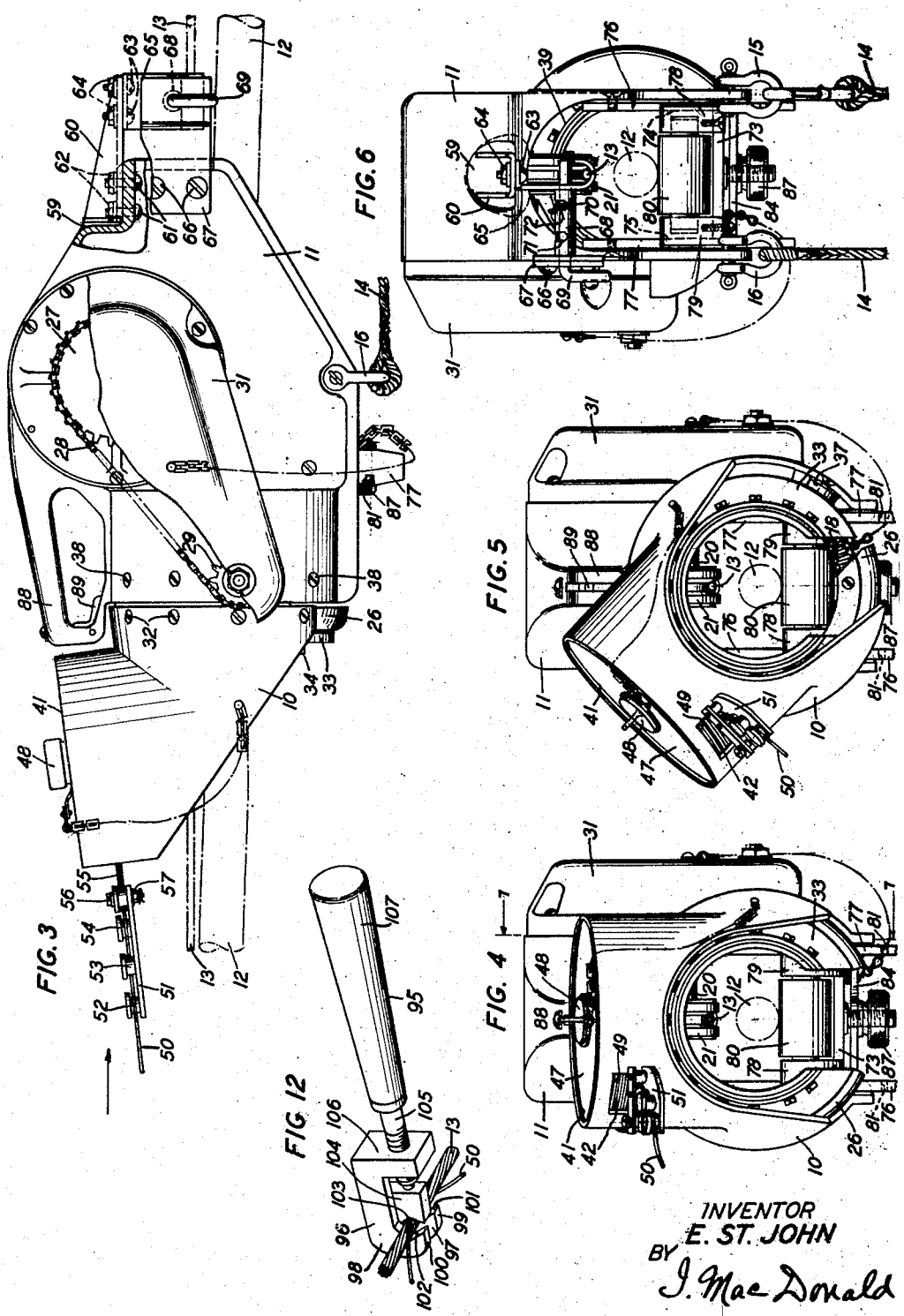

Feb. 18, 1941.　　　　E. ST. JOHN　　　　2,231,962
MEANS FOR SUSPENDING AERIAL CABLES
Filed May 19, 1939　　　4 Sheets-Sheet 3
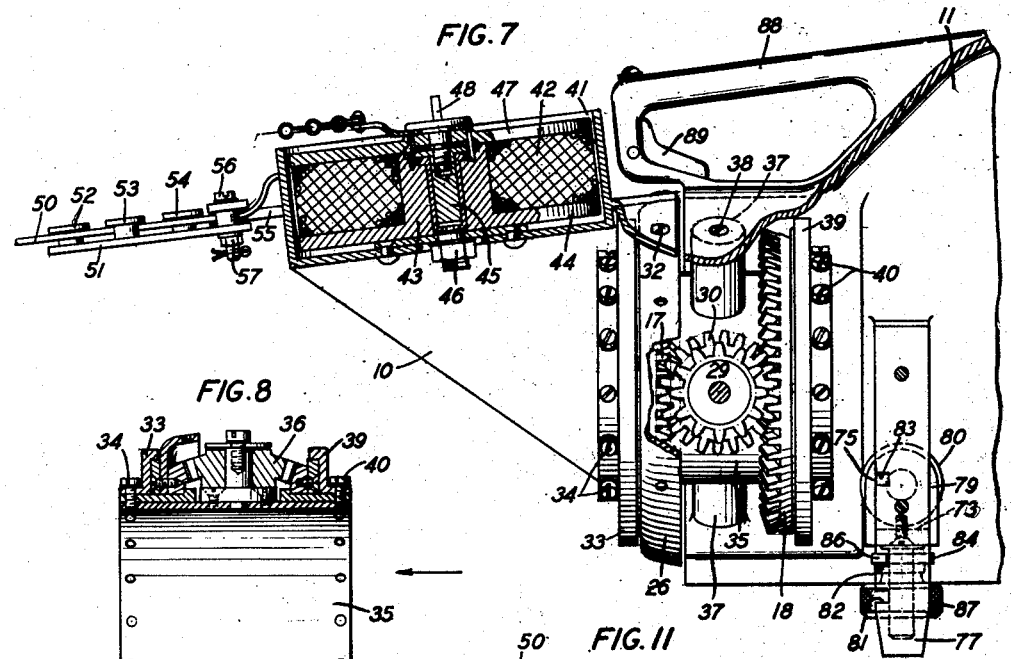
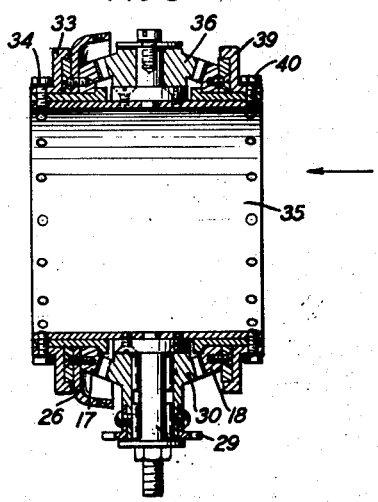
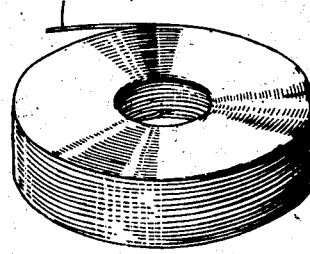
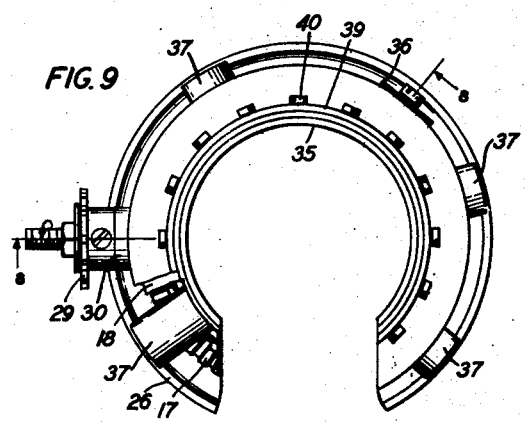
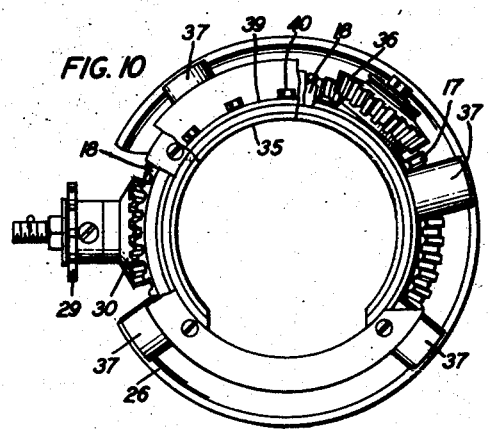
INVENTOR
E. ST. JOHN
BY
J. MacDonald
ATTORNEY Feb. 18, 1941. E. ST. JOHN 2,231,962
MEANS FOR SUSPENDING AERIAL CABLES
Filed May 19, 1939 4 Sheets-Sheet 4
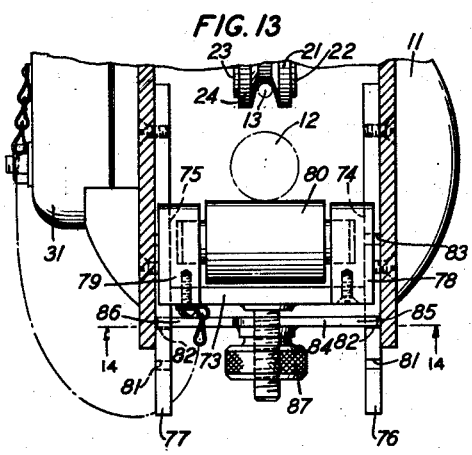
FIG. 13
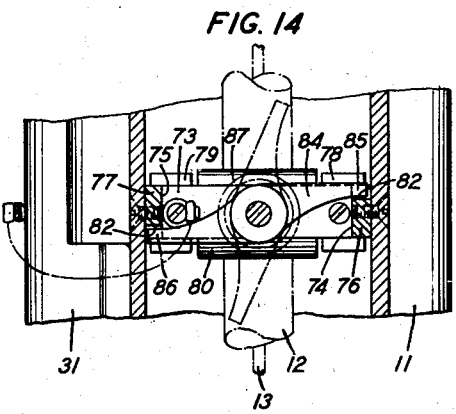
FIG. 14
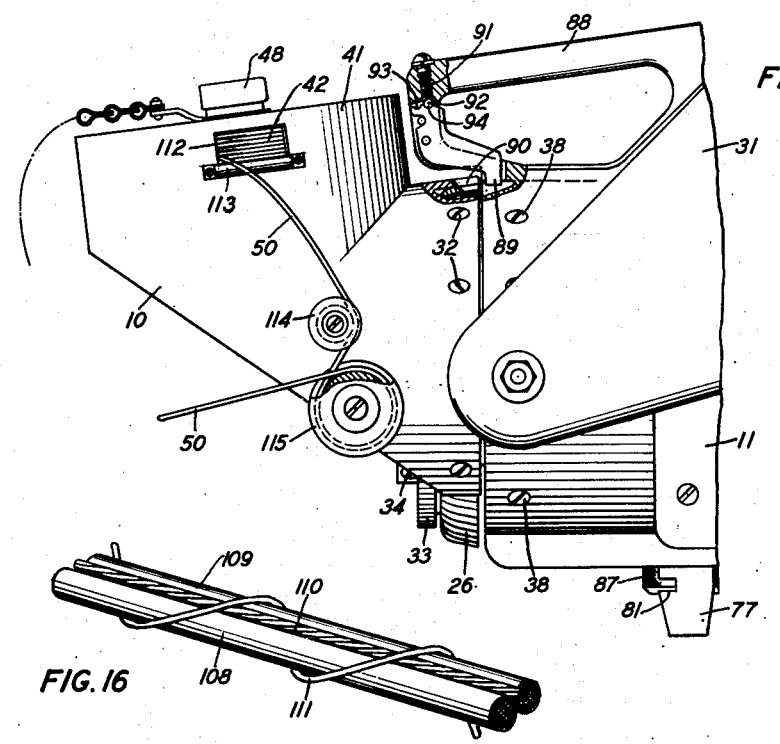
FIG. 15
FIG. 16
INVENTOR
E. ST. JOHN
BY
J. MacDonald
ATTORNEY Patented Feb. 18, 1941

2,231,962

UNITED STATES PATENT OFFICE 2,231,962

MEANS FOR SUSPENDING AERIAL CABLES

Everett St. John, Westport, Conn., assignor to Bell Telephone Laboratories, Incorporated, New York, N. Y., a corporation of New York Application May 19, 1939, Serial No. 274,473

5 Claims. (Cl. 175—376)

This invention relates to the installation of aerial cable and more particularly to a machine for securing an aerial cable to a messenger or supporting strand.

It is the object of this invention to provide a device for securing an aerial cable to a supporting strand in such a manner that there will be a minimum amount of movement therebetween.

Another object of this invention is to provide in a single unitary structure, means for holding the supporting strand and cable in close relation and serving a wire therearound to bind them snugly together.

A further object of this invention is the provision of a machine for securing together an aerial cable and a supporting strand which may be applied and removed from the strand and cable with a minimum amount of effort.

A still further object of this invention is the provision, in a machine for binding together a cable and a supporting strand, of a magazine for storing a preformed coil of wire.

A still further object of this invention is the provision in a machine for lashing cable to a strand, of means for applying a predetermined amount of tension to the lashing wire as it leaves the magazine.

The machine of this invention is an improvement upon the machine which forms the subject of Patent No. 2,153,072 to A. C. Bookout et al. dated April 4, 1939.

In the present standard method of supporting aerial cables from supporting strands, in which the cable is hung from the messenger or supporting strand by means of cable rings or the like, said rings are rigidly secured to the strand and the cable hangs loosely therefrom and is spaced some distance below the supporting strand.

While the above method of supporting aerial cable has had a wide usage it has, nevertheless, some serious disadvantages. For example, the cable is subjected to considerable damage due to the creeping and buckling, which movement causes crystallization of the sheath, ring cuts and other damage. Furthermore, due to the excess movement between the cable and the strand, chafing and dancing results which causes serious damage to the cable sheath.

All damages to aerial cable are expensive to repair and result in a loss of revenue due to the interruption of service.

Having in mind the shortcomings of the method of supporting aerial cable by means of rings, I have devised an improved machine for securing aerial cable to a messenger or supporting strand which contemplates the use of a machine which lashes a wire tightly around both the supporting strand and the cable as it proceeds along the cable, thereby eliminating the use of cable rings and the faults ascribed thereto.

The preferred form of my invention comprises a main body portion which forms the forward part of the machine and a revolving spinning head located toward the rear thereof. The main body portion contains the gear mechanism for the operation of the machine and the spinning head contains a magazine which accommodates a preformed coil of wire which, as it revolves, is lashed around both the cable and the strand, thereby securing them together in such a manner that there is little or no movement therebetween.

The features of my invention will be readily understood from the following detailed description made with reference to the accompanying drawings in which:

Fig. 3 is a side elevation of the machine shown in Figs 1 and 2 with parts of the housing broken away;

Fig. 4 is a rear elevation of Fig. 3 looking in the direction of the arrow, with the spinning head in its normal or upright position;

Fig. 5 is a view similar to Fig. 4 except that the spinning head has been rotated slightly;

Fig. 6 is a front elevation of the main body portion or the front end of the machine;

Fig. 7 is an enlarged sectional view of the spinning head taken on a line 7—7 of Fig. 4;

Fig. 8 is a transverse sectional view of the gear mechanism for driving the spinning head taken on line 8—8 of Fig. 9;

Fig. 9 is an end view of Fig. 8 looking in the direction of the arrow;

Fig. 10 is a view similar to Fig. 9 except that parts have been broken away to expose the segmental ring gears, the driving pinion and the idler pinion;

Fig. 11 is a perspective view of the preformed coil of wire which is stored in the magazine of the machine;

Fig. 12 is a view in perspective of a tool for clamping the lashing wire to the supporting strand to prevent it from unwinding when the lashing wire is cut to permit the removal of the machine;

Fig. 13 is a fragmentary view of the roller mechanism for supporting the cable;

Fig. 14 is a bottom view of the mechanism shown in Fig. 13 and illustrates the arrangement for locking this mechanism in position;

Fig. 15 is a view similar to Fig. 7 except that no parts have been broken away and that a modified form of brake mechanism is employed; and Fig. 16 shows two cables lashed to a single supporting strand.

Figure 1:
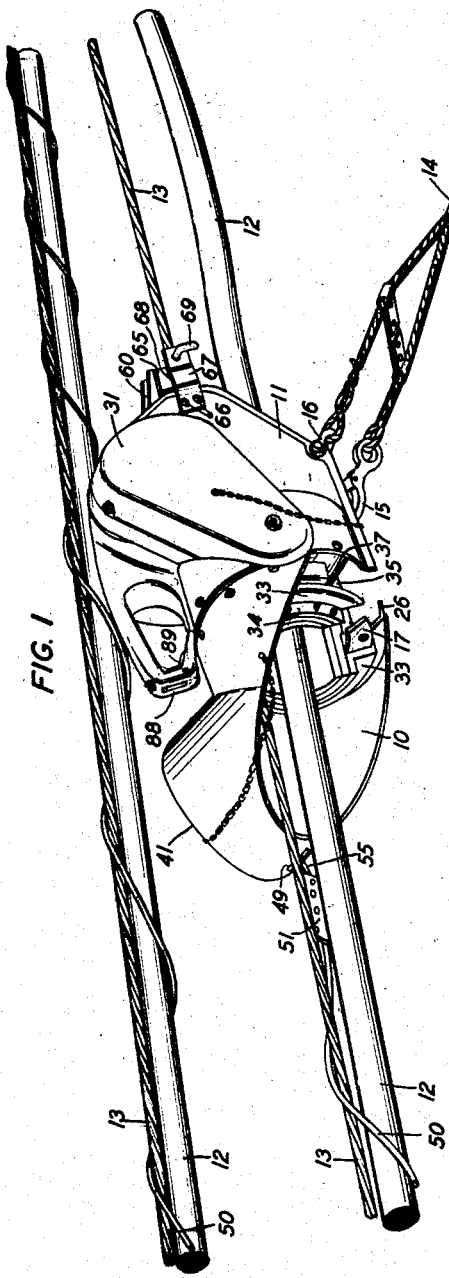
Fig. 1 is a view in perspective of the machine of this invention in position on a fragment of strand and cable in the process of lashing the wire therearound and an adjacent cable previously lashed to a supporting strand by said machine.

As shown in the drawings, the machine of this invention comprises two major portions 10 and 11, the portion 10 constituting the spinning head or rotating member and the main body portion 11 housing the mechanism for causing the head 10 and its component parts to rotate as the machine advances along the cable 12 and strand 13 as it is pulled along by means of the line 14 which is secured to the front end of the housing 11 by suitable link members 15 and 16.

In order that the machine may be readily placed over the cable and strand, the bottom portion of the spinning head 10 and the main body 11 are cut away. The ring gears 17 and 18, which form the driving means for the spinning head 10, also have a portion cut away to permit them to encircle the strand 13 and the cable 12 as shown in Fig. 9.

Figure 2:
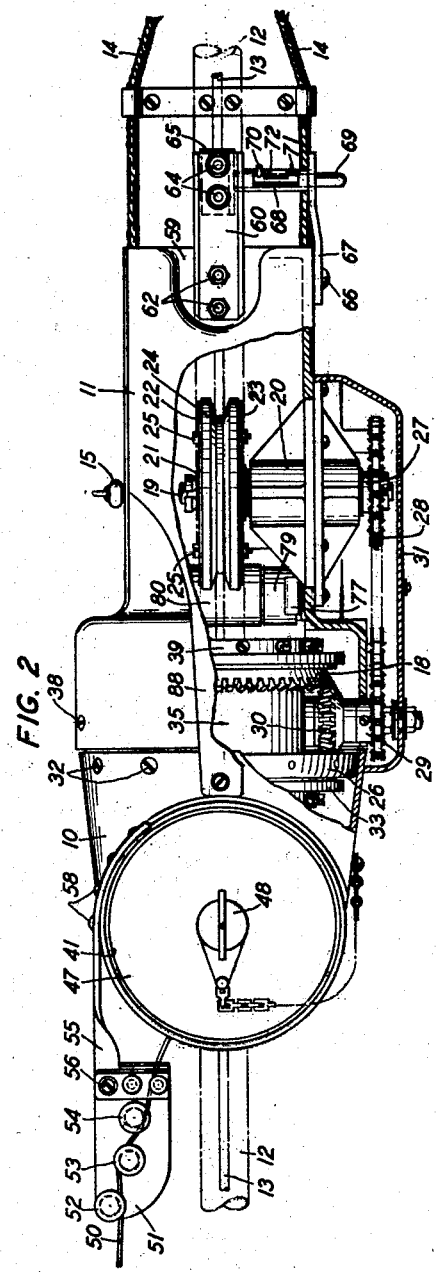
Fig. 2 is a top plan view of the machine in Fig. 1 with parts of the housing broken away to show the operating mechanism for rotating the spinning head.

As shown in Figs. 2 and 3 there is positioned in the main housing or body portion 11 an axle 19. This axle is journaled in the bearing 20. Located on the inner end of the axle 19 is a grooved pulley 21 which frictionally engages the messenger or supporting strand 13 when the machine is in operative position. The pulley 21 comprises two metallic flanges or plates 22 and 23 between which is secured a grooved member 24 made from tough rubber or some other similar material which will firmly grip the strand 13 and yet not wear unduly. The flanges 22 and 23 are secured to the grooved member 24 by means of the bolts 25 which cause the flanges to firmly embrace this member and prevent distortion. The other end of the axle 19 extends a short distance beyond the housing 11 and is provided with a sprocket wheel 27 to which is attached a link chain 28 which in turn is connected to a small sprocket wheel 29. The sprocket 29 is journaled on the cylindrical member 35 and has mounted thereon the driving pinion gear 30. Therefore, any motion imparted to the pulley 21 will cause, through the sprocket 27, the link chain 28 and the small sprocket 29, the rotation of the pinion 30, and due to the fact that the sprocket wheel 27 is larger than the sprocket 29 the rotation of the pinion 30 will be multiplied. A cover 31 is provided over the sprockets 27 and 29 and the chain 28 to prevent injury and to exclude dirt.

The spinning head 10 is rotatably mounted to the rear of the main body portion 11 and is fastened to the slotted flange 26 by the screws 32. The flange 26 is secured to the slotted ring gear 17. The ring gear 17 has as its bearing a grooved guide member 33 which is secured around the periphery of the slotted cylindrical member 35 by means of the screws 34, said cylindrical member 35 being spaced away from and supported inside the housing 11 by means of the posts 37 and the screws 38. The slotted ring gear 18 is mounted in a similar guide member 39 located on the opposite end of the member 35 which is secured thereto by means of the screws 40. Journaled on the periphery of the member 35 between the inner wall of the housing 11 and the outer surface of member 35 is the driving pinion 30 and the idler pinion 36, the driving pinion 30 and the idler pinion 36 being in mesh with the ring gears 17 and 18. These pinions are so positioned, with respect to the slotted ring gears 17 and 18, that at all times the driving pinion 30 will transmit power to the spinning head 10 and the rotation thereof will be continuous without interruption due to the fact that when the gear 17 is out of mesh with the driving pinion 30, due to the slot in this gear, the power is transmitted from the driving pinion 30 through the ring gear 18 to the idler pinion 36 and gear 17 which is secured to the spinning head 10. During those periods when the driving pinion 30 is in mesh with the gear 17 the drive will be directly through these two gears and the idler pinion 36 and the ring gear 18 merely idle.

Located on the spinning head 10, toward the rear thereof, is a magazine 41 for storing the preformed coil of wire 42, as shown in Fig. 11. As shown in Fig. 7 this coil of wire is positioned on the rotatable spool or reel 43 which is provided with a flange 44 on its bottom portion. This is to permit the coil of wire to be readily slipped over the hub member of the reel. The reel 43 is mounted on the spindle 45 which is in turn secured to the spinning head 10 by means of the nut 46. A cover 47 forming the upper flange is provided to maintain the coil of wire in place and is secured in position by means of the wing bolt 48 which engages the upper end of the reel 43. A window or opening 49 is provided in the side of the magazine 41 toward the rear thereof to permit the wire 50, which forms the coil 42, to leave the magazine and be wrapped around the cable 12 and strand 13 which will hereinafter be described in detail.

In order to provide back tension on the wire 50 to prevent loosening thereof means are provided for braking the wire as it leaves the magazine 41.

As shown in Figs. 2, 3, 4, 5 and 7 the braking device comprises a base plate 51 having rotatably mounted thereon the pulleys 52, 53 and 54 over which the wire 50 passes before it is wrapped around the strand 13 and cable 12. The base plate 51 is pivotally mounted, adjacent the window 49, on the bracket 55 by means of the nut and bolt 56 and 57. The bracket 55 is secured to the side of the magazine 41 by means of the rivets 58.

In order to guide the machine and hold it in position on the strand 13, means is provided on the front end thereof for aligning the strand with the pulley 21. As shown in Figs. 2, 3 and 6 there is secured to the front end of the housing or body portion 11, in the recess 59, a bracket 60. This bracket is secured to the housing by means of the bolts 61 and nuts 62 and extends a short distance out beyond the end of said housing. Rigidly secured to the free end of the bracket 60 by means of the bolts and nuts 63 and 64 and extending downwardly in alignment with the pulley 21 is the J-shaped bracket 65. Secured on the side of the housing 11 adjacent the bracket 60 by means of the screws 66 is the arm 67 which has located in an aperture in the free end thereof and extending between the arm and the bracket 65 a slotted tubular member 68. This tubular member is rigidly secured to both the arm 67 and the bracket 65 and serves as a guide for the sliding bolt 69 which is arranged to form a closure for the curved portion of the bracket 65 to prevent the dislodgement of the strand 13. Due to the pin 70 and the notches 71 and 72 this bolt may be locked in either an open or a closed position.

As shown in Figs. 4, 5, 6, 7, 13 and 14 there is provided in the housing 11, beneath and slightly rearward of the pulley 21 a means for supporting and maintaining the cable 12 in close proximity with the strand 13 while the wire 50 is being wrapped therearound. This cable positioning means comprises a slidable member 73 having grooves 74 and 75 in the ends thereof which engage the rails 76 and 77 which are secured on the inside of the housing 11. Mounted on said slidable member between the end portions 78 and 79 is the rotatable member or roller 80 which is arranged to bear against the bottom portion of the cable 12 and force it upward toward the strand 13. In order to provide for various diameters of cable, adjustable means comprising notches 81, 82 and 83 in the side rails and a pivoted member 84 located on the bottom of said slidable member 73 and having end portions 85 and 86 which register with the notches in the rails 76 and 77, is provided. The pivoted member 83 is locked in the desired position by means of the knurled knob 87.

As shown in Figs. 1, 3, 5, 7 and 15 there is located in the handle 88, adjacent the spinning head 10, a latch 89. This latch is pivotally mounted in the handle and is arranged to engage a notch 90 located on the spinning head and flange 26 and is maintained either in engagement with the notch or out of engagement with it by means of the spring 91 which bears against a ball 92 which frictionally engages the notches 93 and 94. The purpose of this latch is to maintain the spinning head in a normal or upright position when it is being applied or removed from the cable and strand.

In order to prevent the lashing wire 50 from unwinding or loosening from the cable 12 and strand 13 there has been provided a suitable tool 95 as shown in Fig. 12, for clamping the lashing wire to the strand.

This tool comprises a C-shaped head 96 having a portion thereof cut away to provide the two parallel members 97 and 98. These two members are hook-shaped at their free ends 99 and 100 and are provided with V-shaped notches 101 and 102. Slidingly mounted between the parallel members 97 and 98 and having a V-shaped notch 103 in the bottom thereof is the member 104. This member is pivotally secured to the threaded member 105 which is rotatably mounted in the upstanding portion or boss 106 of the C-shaped head 96. A handle 107 is rigidly secured to the threaded member 105, to impart a rotatable motion thereto. Therefore, it is readily apparent that the rotation of the handle 107 will cause the member 103 to either approach or recede from the notched portions 99 and 100. Therefore, when the strand 13 and the wire 50 are positioned in the notches 101 and 102 and the notched member 104 is forced down into engagement therewith by means of the rotation of the handle 107, the strand 13 and the wire 50 will be securely held in the notches 101, 102 and 103 against loosening and the lashing wire 50 may be cut at the machine without fear of it unwinding.

To install aerial cable using applicant's improved machine and where the messenger or supporting strand is secured to spaced poles, cable rings which form a temporary support for the cable are secured to the strand in the usual manner but are spaced some distance apart, as shown in Figs. 6 and 7 of the said Bookout patent. The cable 13 is then pulled through and positioned in the rings. The number of rings needed to support the cable will depend upon the length of the span and the size and weight of the cable. After the cable 13 has been positioned in the rings the machine of this invention is hoisted up and placed over the strand 13 and the cable 12. However, before the machine can be placed over the cable and strand the spinning head 10 must be locked in its upright position as shown in Figs. 2, 3, 4, 6 and 7. In this position the slotted portion of the ring gears 17 and 18 will be at the bottom of the machine and will permit the easy passage of the strand and cable. After the spinning head 10 has been locked in its upright position the next step preparatory to placing the machine in position is to remove the cable supporting assembly 73 which is slidably mounted in the bottom of the housing 11 as heretofore described. This assembly 73 is removed by loosening the knob 87 which permits the rotation of the pivoted member 84. This causes the ends 85 and 86 of this member to become disengaged from the notches in the rails 76 and 77 and permits the assembly 73 to be slid downward and out of the way.

The next step is to slide the bolt 69, located in the slotted tube 68 in the strand guide, at the front end of the machine, outward. This opens the guide to permit the entrance of the strand 13.

With the spinning head 10 locked in its upright position, the cable supporting assembly 73 out of the way, the cable guide open and the line 14 unfastened, the machine may now be placed in position on the strand 13, first locating the strand 13 in the guide bracket 65 and positioning the machine so that the groove in the pulley 21 registers with the strand 13. After the machine has been positioned on the strand 13, the sliding bolt 69 is pushed inward to securely hold the strand within the confines of the bracket 65. The cable supporting assembly 73 which is positioned between the guide rails 76 and 77 with the roller 80 bearing against the bottom of the cable 12 is pushed upward until the pivoted member 84 registers with the proper notches on the sides of the rails 76 and 77 for that particular size of cable. After the cable supporting assembly 73 has been locked in position by means of the knob 87, the latch 89 is released and locked out of engagement with the spinning head 10, the line 14 is resecured and the lashing of the cable and strand may now proceed.

As the machine is pulled along the strand by any suitable means as, for example, by pulling on rope 14, the spinning head 10 is caused to rotate and wrap the wire 50, stored in the magazine 41, around the cable 12 and strand 13 by means of the mechanism heretofore explained. As the machine progresses along the strand 13 the wire 50 is lashed tightly around the cable 12 and strand 13 as shown in Fig. 1, and the temporary supporting rings, not shown, are removed, as, for example, by a lineman riding the strand. The machine thus proceeds along the strand until the next pole is reached whereupon the lashing wire 50 is fastened to the strand 13 by means of the tool shown in Fig. 12 to prevent the wire from unwrapping while it is being cut and fastened. The machine may now be removed from the strand and placed on the other side of the pole after the spinning head 10 has been locked in its upright position, the cable supporting assembly 73 removed, the cable guide opened and the line 14 unfastened as heretofore explained. The heretofore described procedure is repeated on each span until the entire cable length has been secured to the strand.

As shown in Fig. 16, two cables 108 and 109 may be secured to a common messenger strand 110 by the machine of this invention which lashes a wire 111 therearound.

There is shown in Fig. 15 a modified form of braking mechanism in which the wire 50, stored in the magazine 41, is brought out through the window 112 over the member 113 around the pulleys 114 and 115 and thence around the cable as heretofore described.

While there has been shown herein and described the preferred embodiment of the invention, it will be understood that various modifications and changes may be made therein without departing from the spirit of the invention.

What is claimed is:

1. A device for securing a cable to a messenger or supporting strand which comprises a housing having a spinning head located at one end thereof, said housing and spinning head arranged to be positioned about and advanced along the strand and cable, a preformed coil of lashing material carried by said spinning head, a shaft journaled in said housing and having a pulley on one end thereof which frictionally engages the strand and means on the other end connected to said spinning head to cause the rotation thereof as it advances to cause the lashing material carried by said spinning head to be wrapped around the cable and strand and means on the front end of said housing for guiding said strand into contact with said pulley.

2. A device for securing a cable to a messenger or supporting strand which comprises a housing having a spinning head rotatably mounted at one end thereof, said housing and spinning head having their bottom portions cut away to permit them to be positioned about the strand and cable, a preformed coil of lashing material carried by said spinning head, and a pulley journaled in said housing frictionally engaging said strand, said pulley having connected thereto a sprocket wheel which in turn is operatively connected to a pinion gear, said pinion gear driving a ring gear which drives an idler pinion which in turn drives a ring gear secured to said spinning head to cause the rotation thereof as it advances to cause the lashing material carried by said spinning head to be wrapped around the cable and strand.

3. A device for securing a cable to a messenger or supporting strand which comprises a housing having a spinning head rotatably mounted at one end thereof, said housing and spinning head having their bottom portions cut away to permit them to be positioned about the strand and cable, a preformed coil of lashing material carried by said spinning head, and a pulley journaled in said housing frictionally engaging said strand, said pulley having connected thereto a sprocket wheel which is operatively connected to a pinion gear, said pinion gear driving a slotted ring gear which drives an idler pinion which in turn drives a slotted ring gear secured to said spinning head to cause the rotation thereof as it advances to cause the lashing material carried by said spinning head to be wrapped around the cable and strand.

4. A device for securing a cable to a messenger or supporting strand which comprises a housing having a spinning head rotatably mounted at one end thereof, said housing and spinning head having their bottom portions cut away to permit them to be positioned about the strand and cable, a magazine on said spinning head, a preformed coil of lashing material carried by said spinning head in said magazine, a pulley journaled in said housing frictionally engaging said strand, said pulley operatively connected to a set of gears, one of which is secured to said spinning head to cause the rotation thereof as it advances to cause the lashing material carried by said spinning head to feed from said magazine and be wrapped around the cable and strand, a roller mounted in said housing below said pulley for supporting said cable and means on said housing for indexing said spinning head with respect to said housing so that the cut-out portions of each may be locked in alignment with each other.

5. A device for securing a cable to a messenger or supporting strand which comprises a housing having a spinning head rotatably mounted at one end thereof, said housing and spinning head having their bottom portions cut away to permit them to be positioned about the strand and cable, a preformed coil of lashing material carried by said spinning head, a pulley journaled in said housing frictionally engaging said strand, said pulley operatively connected to a set of gears, one of which is secured to said spinning head to cause the rotation thereof as it advances to cause the lashing material carried by said spinning head to be wrapped around the cable and strand, means comprising a roller mounted in said housing below said pulley for supporting said cable and means on said roller assembly for positioning and locking said roller with respect to said cable.

EVERETT ST. JOHN.